(12) United States Patent
Grote et al.

(10) Patent No.: US 8,530,364 B2
(45) Date of Patent: Sep. 10, 2013

(54) MATERIAL MIXTURE FOR PRODUCING A FIREPROOF MATERIAL, FIREPROOF MOLDED BODY AND METHOD FOR THE MANUFACTURING THEREOF

(75) Inventors: Holger Grote, Mülheim (DE); Wolfgang Kollenberg, Brühl (DE); Christian Nikasch, Mülheim an der Ruhr (DE); Dieter Nikolay, Mayen-Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 13/121,481

(22) PCT Filed: Sep. 21, 2009

(86) PCT No.: PCT/EP2009/062172
§ 371 (c)(1),
(2), (4) Date: Jun. 3, 2011

(87) PCT Pub. No.: WO2010/034680
PCT Pub. Date: Apr. 1, 2010

(65) Prior Publication Data
US 2011/0237420 A1    Sep. 29, 2011

(30) Foreign Application Priority Data
Sep. 29, 2008   (EP) .................................... 08017130

(51) Int. Cl.
C04B 35/482  (2006.01)
C04B 35/443  (2006.01)

(52) U.S. Cl.
USPC ........................ 501/105; 501/104; 501/120

(58) Field of Classification Search
USPC ........................................ 501/104, 105, 120
See application file for complete search history.

(56) References Cited

U.S. PATENT DOCUMENTS

| | | | | |
|---|---|---|---|---|
| 4,506,024 A | * | 3/1985 | Claussen et al. | 501/105 |
| 2009/0221416 A1 | * | 9/2009 | Grote et al. | 501/128 |

FOREIGN PATENT DOCUMENTS

| | | |
|---|---|---|
| CN | 1176236 A | 3/1998 |
| CN | 1546421 A | 11/2004 |
| DE | 27 38 247 A1 | 7/1978 |
| DE | 27 45 461 B1 | 3/1979 |
| DE | 100 54 125 A1 | 5/2002 |
| DE | 102 54 676 A1 | 6/2004 |
| EP | 0 558 540 B1 | 9/1993 |
| EP | 1 072 573 A1 | 1/2001 |
| EP | 1 302 723 A1 | 4/2003 |
| JP | 59064567 A | 4/1984 |
| JP | 6092723 A | 4/1994 |
| JP | 6503797 A | 4/1994 |
| JP | 2001526175 | 12/2001 |
| RU | 2178530 C2 | 1/2002 |
| SU | 687048 A1 | 9/1979 |
| SU | 900089 A1 | 1/1982 |
| WO | 9203391 * | 3/1992 |
| WO | 9932417 * | 7/1999 |
| WO | WO2007003587 | 1/2007 |

* cited by examiner

Primary Examiner — Karl Group

(57) ABSTRACT

A material mixture for producing a fireproof material, including spinel and zirconium oxide and a coarse-grained fraction with a weight fraction of greater than 50% and a fine-grained fraction, wherein the coarse-grained fraction includes coarse grains with dimensions larger than 20 μm and the fine-grained fraction includes fine grains with dimensions smaller than 20 μm.

2 Claims, 1 Drawing Sheet

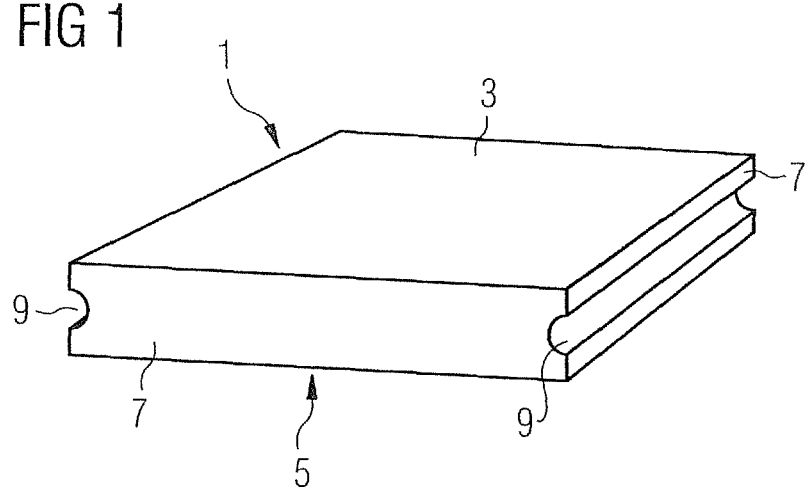
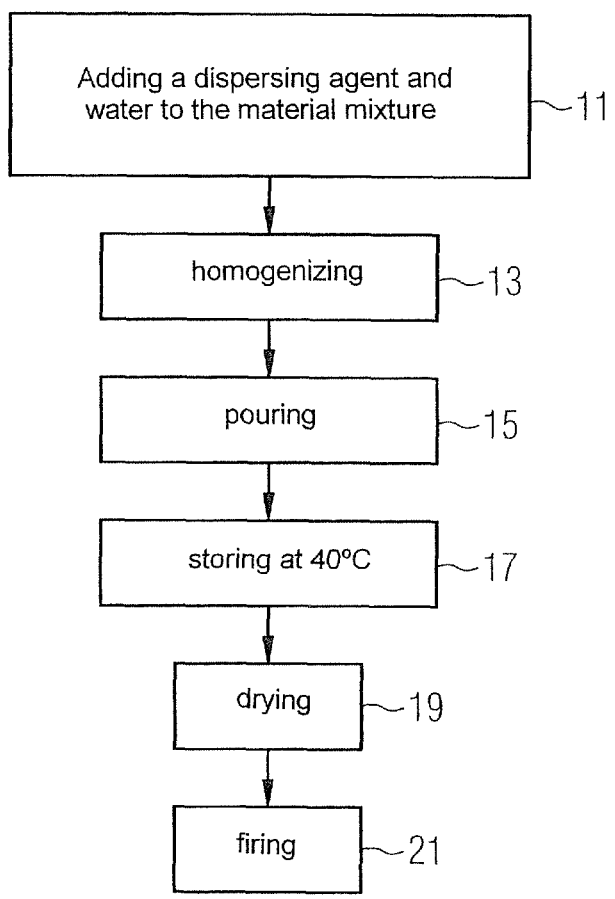

MATERIAL MIXTURE FOR PRODUCING A FIREPROOF MATERIAL, FIREPROOF MOLDED BODY AND METHOD FOR THE MANUFACTURING THEREOF

CROSS REFERENCE TO RELATED APPLICATIONS

This application is the US National Stage of International Application No. PCT/EP2009/062172, filed Sep. 21, 2009 and claims the benefit thereof. The International Application claims the benefits of European Patent Office application No. 08017130.9 EP filed Sep. 29, 2008. All of the applications are incorporated by reference herein in their entirety.

FIELD OF INVENTION

The present invention relates to a material mixture for producing a refractory material. It also relates to a refractory molded body for high-temperature gas reactors, in particular a heat shield element for a gas turbine, and to a method for manufacturing the refractory molded body.

BACKGROUND OF INVENTION

The walls of hot gas carrying high-temperature gas reactors, e.g. of combustion chambers in gas turbine plants, require thermal protection of their supporting structure against hot gas attack. The thermal protection can be provided, for example, by a hot gas lining upstream of the actual combustion chamber wall, e.g. in the form of a ceramic heat shield. A hot gas lining of this kind is generally made up of a number of metal or ceramic heat shield elements lining the surface of the combustion chamber wall. Because of their temperature resistance, corrosion resistance and low thermal conductivity, ceramic materials are ideally suited, compared to metal materials, for constructing a hot gas lining. A ceramic heat shield is described e.g. in EP 0 558 540 B1.

Because of the typical thermal expansion characteristics of the material and the temperature differences occurring during operation—e.g. between ambient temperature when the gas turbine plant is shut down and maximum full-load temperature—flexibility for thermal movement, particularly of ceramic heat shields, as a result of temperature-dependent expansion must be ensured, so that no heat-shield-destroying thermal stresses occur due to said temperature-dependent expansion being prevented. Expansion gaps are therefore provided between the individual heat shield elements in order to allow for thermal expansion of the heat shield elements. For safety reasons, the expansion gaps are designed such that they are never completely closed even at maximum hot gas temperature. It must therefore be ensured that the hot gas does not pass through the expansion gaps to the supporting wall structure of the combustion chamber. In order to seal the expansion gaps against the ingress of hot gas, they are frequently scavenged with seal air flowing in the direction of the combustion chamber interior. As seal air, air is generally used which is simultaneously employed as cooling air for cooling retaining elements for the heat shield elements, which results, among other things, in temperature gradients in the region of the edges of a heat shield element. As a result of the scavenging of the expansion gaps with seal air, the peripheral sides bordering the gaps as well as the cold side of the heat shield elements are cooled. On the other hand, a high heat input because of the hot gas takes place on the hot side of the heat shield elements. Inside a heat shield element, a three-dimensional temperature distribution therefore arises which is characterized by a temperature drop from the hot side to the cold side and by a temperature drop occurring from central points of the heat shield element toward the edges. Therefore, particularly in the case of ceramic heat shield elements, even without contact between adjacent heat shield elements, stresses occur on the hot side which may result in crack initiation and thus adversely affect the service life of the heat shield elements.

The heat shield elements in a gas turbine combustion chamber are typically of flat design and disposed parallel to the supporting structure. A temperature gradient running perpendicular to the surface of the supporting structure only results in comparatively low thermal stresses, as long as unhindered forward flexure in the direction of the interior of the combustion chamber is possible for the ceramic heat shield element in the installed state.

A temperature gradient running parallel to the supporting structure, such as that running from the peripheral surfaces of the heat shield element to the center of the heat shield element, quickly brings about increased thermal stresses because of the rigidity of plate-like geometries in respect of deformations parallel to their largest projection surface. These cause the cold edges of the peripheral surfaces, because of their comparatively low thermal expansion, to be placed under tension by hotter central regions which are subject to greater thermal expansion. If the material strength is exceeded, this tension can result in the initiation of cracks extending out from the edges of heat shield element toward central areas of the heat shield element.

The cracks reduce the load-bearing cross section of the heat shield element. The longer the cracks, the smaller the residual load-bearing cross section of the heat shield element. The thermally induced cracks may lengthen as the result of mechanical stress loads occurring during operation of the gas turbine plant, causing the residual cross section to be reduced still further and possibly necessitating replacement of the heat shield element. Mechanical stress loads of this kind may occur, for example, in the event of oscillatory accelerations of the combustion chamber wall which may be caused by combustion oscillations, i.e. oscillations in the combustion exhaust gases.

In order to reduce the seal air requirement—and therefore thermally induced stresses in heat shield elements, EP 1 302 723 A1 proposes providing flow barriers in the expansion gaps. This can also result in a reduction of the temperature gradient in the region of the edges. However, inserting flow barriers is not always easily possible and also increases the complexity of a heat shield.

In addition, heat shield elements are exposed to severe corrosive attack resulting in a lifetime-limiting loss of material. The material loss occurring in the case of ceramic heat shield elements is attributable to a combination of corrosion, subsequent resintering of the surface and erosive stress caused by the high mass flow of hot gas. Material loss is generally at its greatest where the highest hot gas flow rates obtain. For the ceramic heat shields frequently used nowadays made of corundum and mullite with glass phase, the material loss is essentially due to two reactions, namely first mullite decomposition and secondly grain growth and resintering. The water vapor present in the hot gas results in the decomposition of mullite ($3Al_2O_3*2SiO$, or $2Al_2O_3*1SiO_2$) and glass phase to corundum ($Al_2O_3$) and silicon oxide ($SiO_x$) The corundum then present at the surface of a heat shield element, both in the matrix of the heat shield element and in the corrosion layer of the mullite grains, exhibits grain growth and sintering. Grain growth and sintering increase with operating time. With increasing numbers of gas turbine startups, this results in a weakening of the surface due to microcracking. Consequently, surface particles are entrained by the high mass flow, resulting in erosion. As a result, the service life of the heat shield elements is limited by corrosion, thereby necessitating premature replacement. Add to this the fact that, in the case of heavy oil operation of a gas turbine, magnesium oxide is added as an inhibitor, which likewise results in corrosive thinning of the heat shield elements. This is caused by the corundum in the heat shield element reacting with the magnesium oxide in the inhibitor to produce spinel as a reaction product. This also results in service life reduction and the need to replace the heat shield element prematurely.

DE 27 45 461 discloses a high refractory stone containing magnesium aluminate spinel ($MgAl_2O_4$), comprising 70 to 93 wt % magnesium aluminate spinel, 2 to 8 wt % aluminum oxide, 1 to 9 wt % binder and up to 27 wt % high refractory loading material. Loading materials specified are chromium (III) oxide ($Cr_2O_3$) and calcium zirconium oxide ($CaZrO_3$). In addition, fused spinel, i.e. grains of fusion-cast spinel, are added in order to improve corrosion and thermal shock properties. DE2745461 describes low-CaO materials, but these still have a demonstrable $SiO_2$ component.

DE 27 38 247 describes a high alumina refractory cement which can contain magnesium aluminate spinel. The addition of binders facilitates shaping of the high alumina cement. In addition, the products can be sintered for the first time during use, thereby saving firing costs. However, the disadvantage of such materials are the significantly poorer corrosion properties in a corrosive gas and/or fusion environment.

DE 102 54 676 A1 describes a refractory ceramic molded article with a structure comprising 80 to 95% zirconium oxide ($ZrO_2$) and 5 to 20% magnesium aluminate spinel referred to the total weight, the addition of magnesium aluminate spinel being designed to produce higher thermal shock resistance.

Alternative approaches consist of using metal heat shield elements. Although metal heat shield elements are better able to withstand temperature fluctuations and mechanical stresses than ceramic heat shield elements, in gas turbine combustion chambers, for example, they require complex cooling of the heat shield, as they possess higher thermal conductivity than ceramic heat shield elements. Moreover, metal heat shield elements are more prone to corrosion and, because of their lower temperature stability, cannot be subjected to as high temperatures as ceramic heat shield elements.

SUMMARY OF INVENTION

The first object of the invention is therefore to provide a material mixture for producing a refractory molded body which is particularly suitable for producing heat shield elements for gas turbines. A second object of the present invention is to provide an advantageous method for producing a refractory molded body such as, for example, a heat shield element for a gas turbine. A third object of the invention is lastly to provide an advantageous molded body for high-temperature gas reactors, e.g. a heat shield element for gas turbines.

The first object is achieved by a material mixture for producing a refractory material as claimed in the claims, the second object by a method for producing a refractory molded body as claimed in the claims and the third object by a refractory molded body as claimed in the claims. The dependent claims contain advantageous embodiments of the invention.

The inventive material mixture for producing a refractory material comprises spinel and zirconium oxide, in particular zirconium oxide with monoclinic crystal structure, also known as baddeleyite. It has a coarse-grained fraction in excess of 50 wt % and a fine-grained fraction. The coarse-grained fraction has grains with dimensions greater than 20 µm, preferably in the range between 20 µm and 6 mm and in particular in the range 100 µm to 6 mm, whereas the fine-grained fraction has fine grains with dimensions of less than 20 µm. In particular, magnesium aluminate spinel ($MgAl_2O_4$) and/or sinter spinel and/or fused spinel can be present as the coarse-grained fraction. Here sinter spinel is taken to mean a sintered spinel which is broken down to a desired granularity, while fused spinel is taken to mean a fusion-cast spinel which is then broken down to the desired granularity. In particular, zirconium oxide can be present as the fine-grained fraction. In addition, magnesium aluminate spinel and/or sinter spinel and/or fused spinel can also be present as the fine-grained fraction.

Both in the coarse-grained fraction and in the fine-grained fraction, the magnesium aluminate spinel can have in particular 66 to 78 wt % aluminum oxide ($Al_1O_3$) and 22 to 34 wt % magnesium oxide (MgO). The percentage by weight of the magnesium aluminate spinel in the fine-grained fraction of the material mixture is preferably 30 to 100%, the percentage by weight of the zirconium oxide in the fine-grained fraction 0 to 70%. In particular, the percentage by weight of the magnesium aluminate spinel in the fine-grained fraction of the material mixture can range from 70 to 100% and the percentage by weight of the zirconium oxide in the fine-grained fraction can range from 0 to 30%, in particular the percentage by weight of the zirconium oxide can be >12%.

Using the material mixture according to the invention, a thermal shock and corrosion resistant ceramic material can be produced which is particularly suitable for producing refractory molded bodies such as heat shield elements for gas turbines. The zirconium oxide in the material mixture is used to increase the corrosion resistance and, in particular, by forming microcracks in the matrix, to develop a high thermal shock resistance. Altogether, the material mixture can be used to produce refractory molded bodies, particularly heat shield elements for gas turbines, which have a longer service life than conventional refractory molded bodies. In particular, the use of spinel prevents the breakdown of the mullite and corundum, while nevertheless retaining the basic heat shielding properties. As a result of the longer service life, longer inspection intervals are possible which reduces the operating costs of a gas turbine. However, in addition to the molded products, unmolded products for the power industry, metallurgy, the automotive industry, the glass and cement industry and the chemical industry can be produced from the material mixture. The material mixture according to the invention can in particular also be processed without using a calcium-containing binder.

According to a second aspect of the invention, a method is provided for producing a refractory molded body, in particular a heat shield element for high-temperature gas reactors such as gas turbine combustion chambers, for example. The method according to the invention employs the material mixture according to the invention. To said material mixture is added at least one dispersing agent and/or at least one organically or inorganically based auxiliary agent in order to obtain a moldable composition. The moldable composition is then formed and sintered. A calcined spinel which constitutes a sintering-promoting auxiliary phase can be used here. Calcined spinel powder has a considerably higher specific surface area and is therefore more reactive than sinter spinel.

By using the material mixture according to the invention, the method according to the invention can produce a refractory molded body having the above mentioned advantages over conventional refractory molded bodies, in particular a longer service life and longer inspection intervals.

The forming of the moldable composition can be performed in particular by a casting process, with vibration casting being regarded as the most suitable shaping method. After forming of the moldable composition, hardening is preferably effected before the sintering process takes place. Hardening enables the molded composition to be removed from the mold prior to firing, so that that re-usable molds can be employed.

Sintering preferably takes place at temperatures above 1550° C., so that no unreacted magnesium oxide or aluminum oxide components are present in the finished product.

According to the third aspect of the invention, a refractory molded body for high-temperature gas reactors is provided. This has a ceramic volume comprising spinel and zirconium oxide. The ceramic volume additionally comprises a coarse-grained fraction in a percentage by weight of above 50%, and a fine-grained fraction. The coarse-grained fraction has coarse grains with dimensions greater than 20 μm, the fine-grained fraction having fine grains with dimensions of less than 20 μm. For example, the coarse-grained fraction can have coarse grains with dimensions ranging from 20 μm to 6 mm, particularly in the range from 100 μm to 6 mm.

In particular, magnesium aluminate spinel and/or sinter spinel and/or fused spinel can be present as the coarse-grained fraction here. In particular, zirconium oxide can be present as the fine-grained fraction. In addition, magnesium aluminate spinel and/or sinter spinel and/or fused spinel can also be present as the fine-grained fraction.

The fine-grained fraction preferably contains 70 to 100 wt % magnesium aluminate spinel and 0 to 30 wt % zirconium oxide. Both in the coarse-grained fraction and in the fine-grained fraction, the magnesium aluminate spinel can have 66 to 78 wt % aluminum oxide and 22 to 34 wt % magnesium oxide.

A refractory molded body according to the invention has the advantages already described with reference to the method for the production thereof and with reference to the material mixture over conventional refractory molded bodies, in particular a longer service life and a longer inspection interval.

Further features, properties and advantages of the present invention will emerge from the following description of exemplary embodiments with reference to the accompanying drawings in which

BRIEF DESCRIPTION OF THE DRAWINGS

FIG. 1 schematically illustrates a refractory molded body.
FIG. 2 shows a flow chart for the inventive method for producing a refractory molded body.

DETAILED DESCRIPTION OF INVENTION

FIG. 1 schematically illustrates a heat shield element for a gas turbine combustion chamber as an example of a refractory molded body according to the invention. The heat shield element 1 shown in FIG. 1 has a hot side 3 facing the interior of the combustion chamber, a cold side 5 facing the supporting structure of the combustion chamber, and four peripheral sides 7. In two of the peripheral sides 7, grooves 9 are present which provide access to a retaining clip attaching the heat shield element 1 to the supporting structure. Self-evidently, other retention options can also be used for which the grooves 9 are unnecessary. For example, the cold side 5 of the heat shield element 1 can be bolted to the supporting structure.

The heat shield element 1 of a ceramic based on spinel and baddeleyite, i.e. monoclinic zirconium oxide. The spinel group includes a large number of compounds characterized by a common crystal structure type. Spinel is both the individual name of the cubic hexakisoctahedral magnesium aluminate spinel ($MgAl_2O_4$) and the group name for the oxides isotypic with magnesium aluminate spinel and intermiscible therewith having the general form $AB_2O_4$, where the most frequent cations for A are $Mg^{2+}$, $Mn^{2+}$, $Fe^{2+}$, $Co^{2+}$, $Zn^{2+}$ and $Ni^{2+}$ and, for B, $Al^{3+}$, $Ga^{3+}$, $Cr^{3+}$ and $Fe^{3+}$. Spinels have a wide range of technical applications, e.g. as ferrites in electrical engineering as magnetic materials, chromites and magnesium aluminates as refractories in the foundry, in steel and nonferrous metallurgy, cobaltites as catalysts and manganates as thermistors.

Magnesium aluminate spinel is theoretically composed of a 28.2 wt % MgO and 71.8 wt % $Al_2O_3$ (corundum) and melts at 2135° C. Magnesium aluminate spinel can take up considerable quantities of aluminum oxide ($Al_2O_3$) with mixed crystal formation, with magnesium oxide (MgO) being inserted to a small extent in magnesium aluminate spinel only at high temperatures. Magnesium aluminate spinels form to a minor extent even at temperatures above 1300° C., but to a greater extent only above approximately 1550° C., it being of great technological interest that, during the reaction between magnesium oxide and aluminum oxide to produce magnesium aluminate spinel, an increase in volume of approximately 5 to 15 vol % takes place.

In terms of raw material, a distinction is drawn between sinter spinel, fused spinel and calcined spinel, and in respect of composition between magnesium oxide rich spinels having an aluminum oxide content of less than 71.8 wt % and aluminum oxide rich magnesium aluminate spinels having an aluminum oxide content greater than 71.8 wt %.

The spinel structure of magnesium aluminate spinels is insensitive to severe disorder and to considerable lattice deformations. Because of its high symmetry, the spinel lattice is very stable. Spinel is particularly suitable as a refractory because of its high temperature resistance and its good corrosion resistance compared to basic slags. Spinel is resistant to all metals except alkaline earth metals, while exhibiting greater corrosion resistance to alkali metal attack than corundum and chromium ore. The literature shows that no chemical reactions occur when pure magnesium aluminate spinel comes into contact with sulfates, hydrogen sulfates, fluorides, chlorides, carbonates and hydroxides of sodium, potassium, lithium and calcium at temperatures of approximately 1200° C.

In this example, the ceramic material of the heat shield element has coarse grains with dimensions ranging between 20 μm and 6 mm, particularly in the range between 100 μm and 6 mm, and fine grains with dimensions of less than 20 μm.

The heat shield element 1 from FIG. 1 can be produced using the inventive method for producing a refractory molded body. This method will now be described with reference to the flow chart in FIG. 2.

The starting point for the method according to the invention is an inventive material mixture comprising spinel and zirconium dioxide. The mixture has coarse grains measuring between 20 μm and 6 mm and fine grains measuring less than 20 μm. In this example, the fine-grained fraction is a mixture of magnesium aluminate spinel and zirconium oxide, the percentage by weight of the magnesium aluminate spinel being 70 to 100% and the percentage by weight of the zirconium oxide being 0 to 30%. To this material mixture is added, in a first step, a dispersing agent and water (step 11 in FIG. 2). The resulting mixture is reproduced by way of example below (proportions as a percentage by weight), the abbreviation AR78 standing for spinel with 78% aluminum oxide and 22 to 23% magnesium oxide and the abbreviation MR66 standing for magnesium rich spinel with 66 wt % aluminum oxide and 32 to 33.5 wt % magnesium oxide:

AR78 with grain sizes of 1 to 3 mm 18.6%
AR78 with grain sizes of 0.5 to 1 mm 11.3%
AR78 with grain sizes of <0.5 mm 11.3%
MR66 with grain sizes <1 mm 17%
$Al_2O_3$ with grain sizes <10 μm 7.3%
MgO 4%
Dispersing agent 1%
$Al_2O_3$ with grain sizes <20 μm 2.5%
$ZrO_2$ 18%
Water 9%.

This mixture is then homogenized for 4 minutes in an Erich mixer (step 13) before being poured into a metal mold under vibration (step 15). In order to avoid excessively rapid drying out of the casting slip present in the mold, the mold is sealed in an airtight manner in the sprue region. The casting slip is then stored in the mold for approximately two hours at 40° C. (step 17). This causes the casting slip to harden and ensures that a green compact is produced having the necessary strength for the subsequent shaping. After the green compact has been shaped, it is dried for a further 30 to 50 hours initially at temperatures of between 20 and 60° C., then at temperatures of between 90 and 130° C. (step 19). Finally, the green compact is fired for more than three hours at a temperature in excess of 1550° C. (step 21). The ceramic heat shield element thus produced has a cold bending strength of approximately 15 MPa and a dynamic Young's modulus of approximately 50 GPa.

The following steps can be particularly advantageous in respect of the method:

1. In order to match the spinel material in respect of its elastic modulus and therefore also of its thermal shock resistance to the conditions in the combustion chamber of a stationary gas turbine, the addition of up to 1 wt % of a porosizing agent is particularly advantageous. Various plastics (polypropylene, polyethylene, polystyrene (Styropor), polymethyl methacrylate (acrylic glass), etc.) or natural cellulose can be used as porosizing agents.

2. The thermal shock resistance can likewise be positively influenced by increasing the coarse-grained fraction of the spinel material. It is particularly advantageous to increase the coarse-grained fraction within the range 54 to 70 wt %.

The invention described with reference to the Figures provides a thermal shock and corrosion resistant ceramic material based on a magnesium aluminate spinel with an admixture of zirconium dioxide and consisting of coarse and fine granularities. From this ceramic material, molded or unmolded products can be manufactured for the power industry, metallurgy, the automotive sector, the glass and cement industry and the chemical industry. It can be used as a thermally insulating heat shield in gas turbines, as a drain or outlet nozzle in metallurgy, as a porous filter body in hot gas filtration, etc. The corrosion resistance of this spinel material is significantly increased by avoiding $SiO_2$ additives (free or bound), and minimizing the CaO content.

The invention claimed is:

1. A material mixture for producing a refractory material, comprising:
   spinel;
   zirconium oxide;
   a coarse-grained fraction in a percentage by weight of over 50%; and
   a fine-grained fraction,
   wherein the coarse-grained fraction includes coarse grains with dimensions greater than 20 μm and the fine-grained fraction including fine grains with dimensions of less than 20 μm,
   wherein magnesium aluminate spinel and/or sinter spinel and/or fused spinel is/are present as the fine-grained fraction, and
   wherein the fine-grained fraction includes 70 to <88 wt % magnesium aluminate spinel and >12 wt % and up to 30 wt % zirconium oxide.

2. The material mixture as claimed in claim 1, wherein magnesium aluminate spinel and/or sinter spinel and/or fused spinel is/are present as the coarse-grained fraction.

* * * * *